United States Patent
Chen et al.

(10) Patent No.: US 7,322,838 B1
(45) Date of Patent: Jan. 29, 2008

(54) MEMORY CARD CONNECTOR

(75) Inventors: Chung-yu Chen, Tu-Cheng (TW);
Yu-hung Su, Tu-Cheng (TW);
Chung-hsin Huang, Tu-Cheng (TW);
Mei-chuan Yang, Tu-Cheng (TW)

(73) Assignee: Cheng Uei Precision Industry Co., Ltd., Taipei Hsien (TW)

( * ) Notice: Subject to any disclaimer, the term of this patent is extended or adjusted under 35 U.S.C. 154(b) by 0 days.

(21) Appl. No.: 11/588,398

(22) Filed: Oct. 27, 2006

(51) Int. Cl.
*H01R 13/62* (2006.01)

(52) U.S. Cl. .................. 439/159; 439/631; 439/928.1; 439/946

(58) Field of Classification Search ................ 439/159, 439/377, 630, 631, 928.1, 946
See application file for complete search history.

(56) References Cited

U.S. PATENT DOCUMENTS 7,112,075 B1* 9/2006 Su .............................. 439/159
7,118,397 B1* 10/2006 Su et al. ...................... 439/159
7,128,613 B1* 10/2006 Lee et al. ................... 439/630
7,192,292 B1* 3/2007 Su .............................. 439/159

* cited by examiner

*Primary Examiner*—James Harvey
(74) *Attorney, Agent, or Firm*—Rosenberg, Klein & Lee

(57) ABSTRACT

A memory card connector includes an insulating housing, an ejector, a plurality of first electric terminals, a plurality of second electric terminals, a detected apparatus and a cover. The insulating housing includes a base, a left wall, a right wall and a front wall. All the walls define an upper space and a down space. A glide notch is formed in the right wall. The first electric terminals and the second electric terminals are located in the insulating housing. The ejector is located in the glide notch. The memory card connector can accept a memory card. The detected apparatus determines the correctness of the way that inserting the memory card into the memory card connector.

4 Claims, 7 Drawing Sheets

MEMORY CARD CONNECTOR

BACKGROUND OF THE INVENTION

1. Field of the Invention

This present invention generally relates to a card connector, and more particularly to a memory card connector.

2. The Related Art

Memory cards as a record medium are used in video cameras, digital cameras, mobile phones or other electronic devices. The memory cards include Memory Stick IIcard, SD card, Mini SD card, MMC card, MMC 4.0 card, RS MMS 4.0 card and so on. The memory cards are different in shape and size because there are many different standards for them. In order to use at least two kinds of memory cards in an electric device, a memory card connector for accepting two kinds of memory cards is required.

Traditionally, a two-in-one memory card connector includes a housing, a shell, two receiving slots formed inside the housing. One receiving slot is formed in the upper of the housing, and the other receiving slot is formed under the housing. Two groups of terminals are located inside the two receiving slots. Two memory cards which are different in type are accepted in the two receiving slots.

However, two single troughs superimposed inside the housing to form the aforesaid two receiving slots. An injecting/ejecting device is mounted in the side of the two receiving slots. We can easily find that the design has increased the height of the memory card connector, increased the difficulty of the assemblage, and engrossed large space in housing. What is more, the semblable structure of the two receiving slots causes the inserted card to be inserted wrong easily. In conclusion, the kind of the memory card connector is not suitable for the smart electronic consumable.

SUMMARY OF THE INVENTION

Accordingly, an object of the present invention is to provide a memory card connector including an insulating housing, an ejector, a plurality of first electric terminals, a plurality of second electric terminals, a detected apparatus and a cover. The insulating housing includes a base, a left wall, a right wall and a front wall. All the walls define a holding space. The first electric terminals are located on the first terminal troughs and the first touching portions of the first electric terminals extend upward in the holding space. The second electric terminals are located on the second terminal troughs, and the second touching portions of the second electric terminals extend backward in the holding space. The ejector is placed on a glide notch which is formed in the left wall or the right wall. The ejector includes a sliding portion, a spring and a connecting portion. The sliding portion includes a body and a pushing portion. The front of the body extends inward to form the pushing portion. The pushing portion is located at the inner of the holding space. A sliding block is engendered on the back of sliding beam. A first support beam rises from the base and is adjacent to the left wall. A support block rises from the other side of the base and is adjacent to the rear end of the right wall. The sliding beam connects with the support block to form a second support beam. Thereby, the design contains two kinds of memory cards capable of reducing the accessory of the memory card connector, saving space, and making the assembly conveniently.

DETAILED DESCRIPTION OF THE PREFERRED EMBODIMENTS

Figure 1:
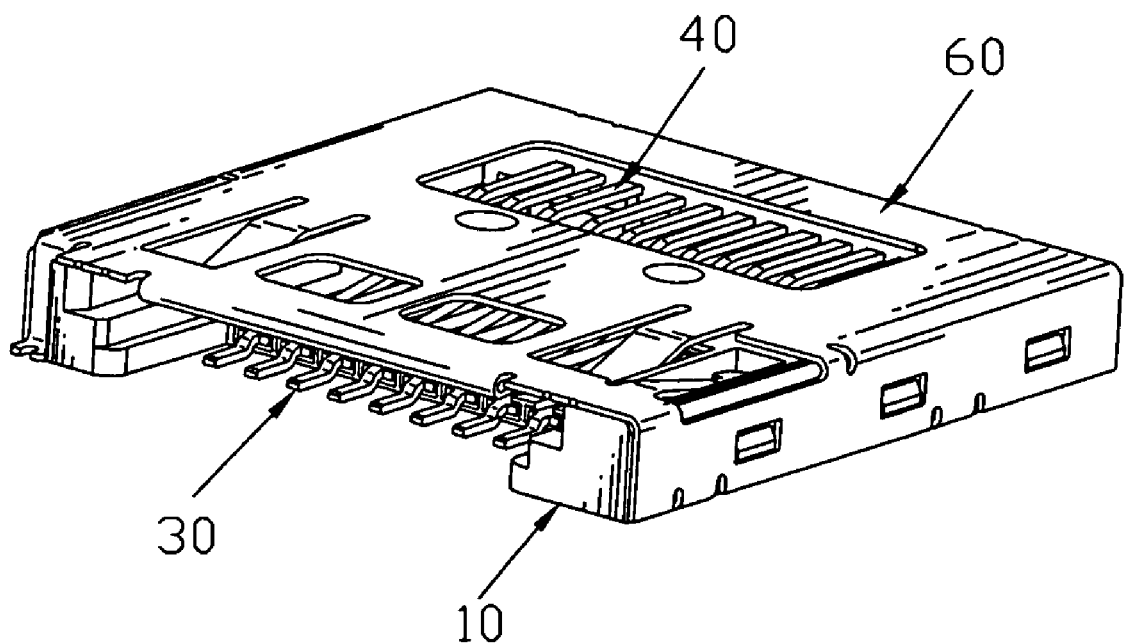
FIG. 1 is an integral view of a memory card connector of the present invention.
Figure 2:
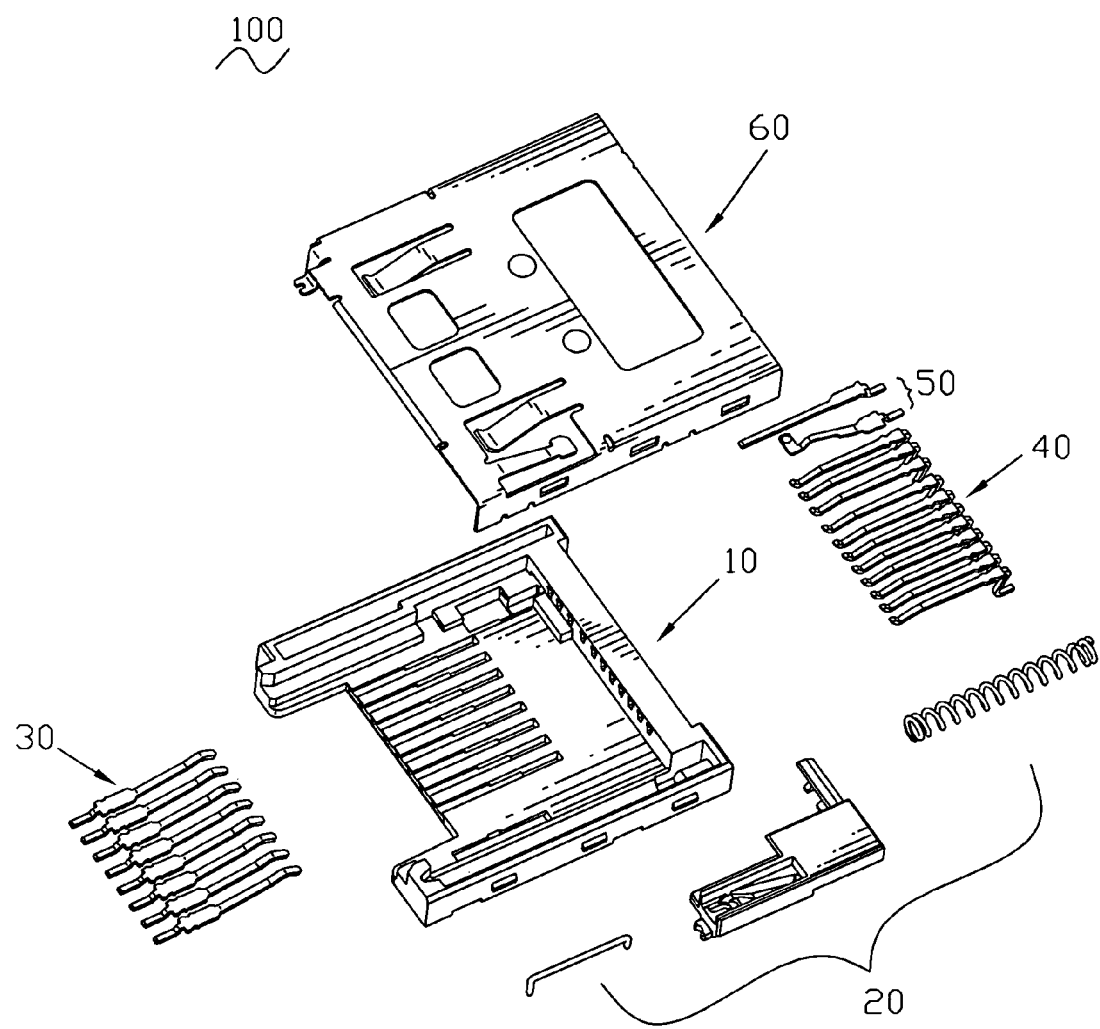
FIG. 2 is an exploded view of the memory card connector of the present invention.

Referring to FIG. 1 and FIG. 2, a memory card connector 100 includes an insulating housing 10, an ejector 20, a plurality of first electric terminals 30, a plurality of second electric terminals 40, a detected apparatus 50 and a cover 60.

Figure 3:
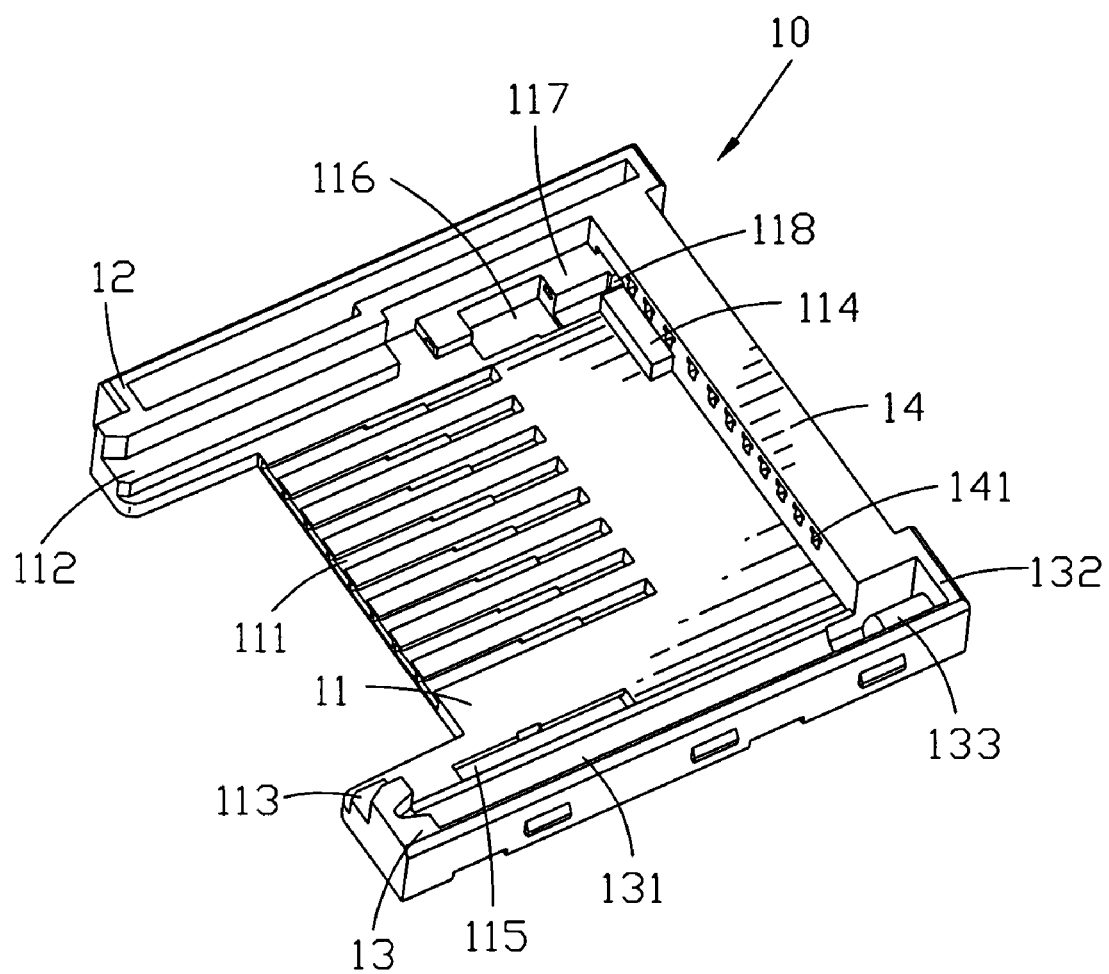
FIG. 3 is a perspective view of an insulating housing of the memory card connector.

Referring to FIG. 3 the insulating housing 10 includes a base 11, a left wall 12 arranged on the left side of the base 11, a right wall 13 located on the right side of the base 11, and a front wall 14 located on a front of the base 11. The left wall 12, the right wall 13 and the front wall 14 define a holding space. A plurality of first terminal troughs 111 are formed on the middle of the base 11. A first support beam 112 rises from the base 11 and is adjacent to the left wall 12. A support block 113 rises from the base 11 and is adjacent to the rear end of the second wall 13. The support block 113 has a same height with the first support beam 112. The holding space is divided into an upper space 80 and an under space 90 by the first support beam 112 and the support block 113. A stopping block 114 rises from the base 11 and is adjacent to the front wall 14 which is engaged in the inner of the first support beam 112. A sliding trough 115 is arranged at the base 11 on the front of the support block 113. A notch 116 is formed on the front of the left wall 12. A first contain trough 117 is located in inner of the front of the left wall 12. The front of the first contain trough 117 goes through the front wall 14, and the rear of the first contain trough 117 extends backward beside the notch 116. A second contain trough 118 is formed on the base 11 and adjacent to the first contain trough 117. The rear of the second contain trough 118 connects with the notch 116. A glide notch 131 is formed on the right wall 13, and the left side of the glide notch 131 connects with the holding space. A pillar 133 is arranged on the inner wall 132 of the glide notch 131. A plurality of second terminal troughs 141 are formed on the front wall 14 upside the stopping block 114.

Figure 4:
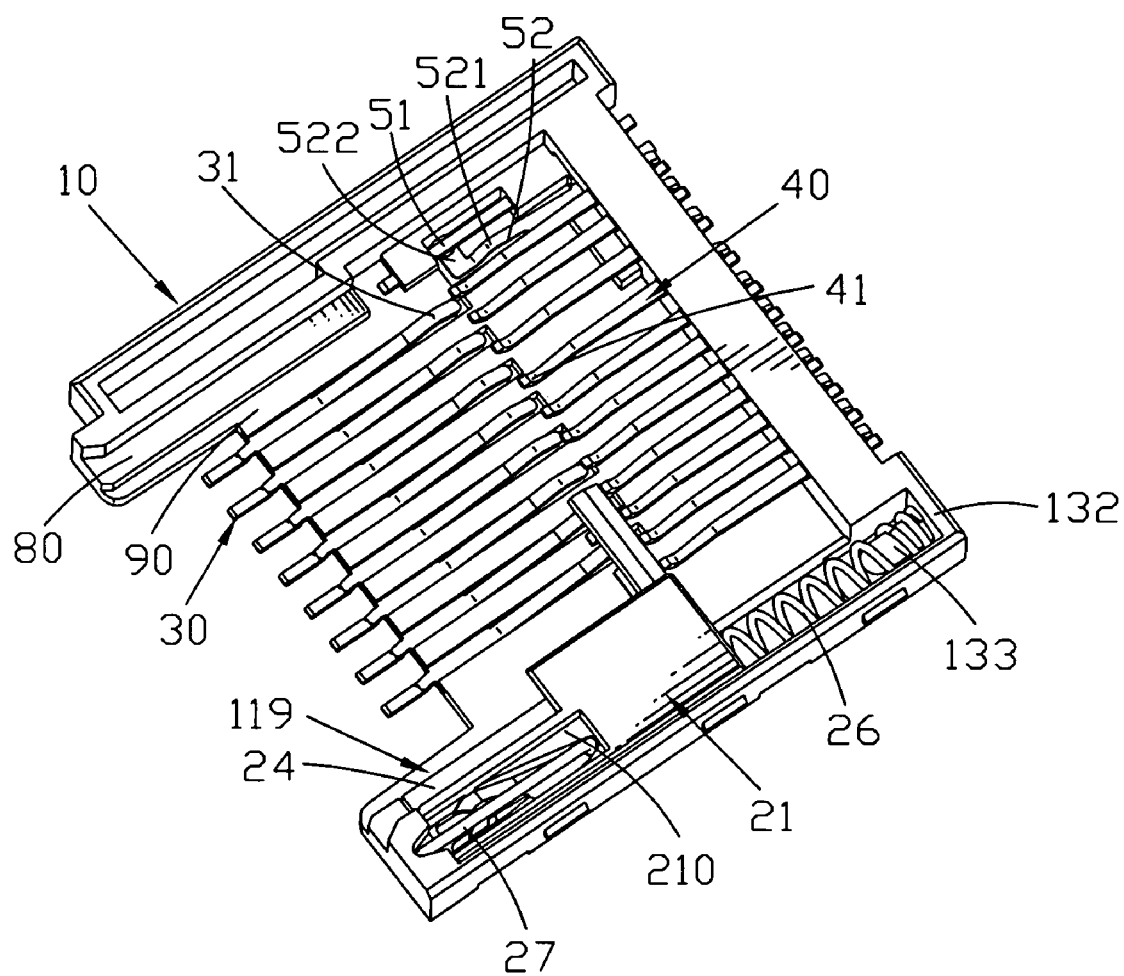
FIG. 4 is a perspective view of the memory card connector without a cover.

Referring to FIG. 4, the ejector 20 is placed on the glide notch 131. The ejector 20 includes a sliding portion 21, a spring 26 and a connecting portion 27. The front of the spring 26 sets on the pillar 133, and the rear of the spring 26 pushes against the sliding portion 21. The two ends of the connecting portion 27 extend downward and the connecting portion 27 is located on the other side of the sliding portion 21. The front of the connecting portion 27 is located on the trace trough 210 which is arranged in the sliding portion 21. The rear of the connecting portion 27 is located on the insulating housing 10. Suppose the sliding portion 21 moving forward, the front of the connecting portion 27 also moving in the trace trough 210. By the structure of the trace trough 210, the memory card can be fixed at the memory card connector 100.

Figure 5A:
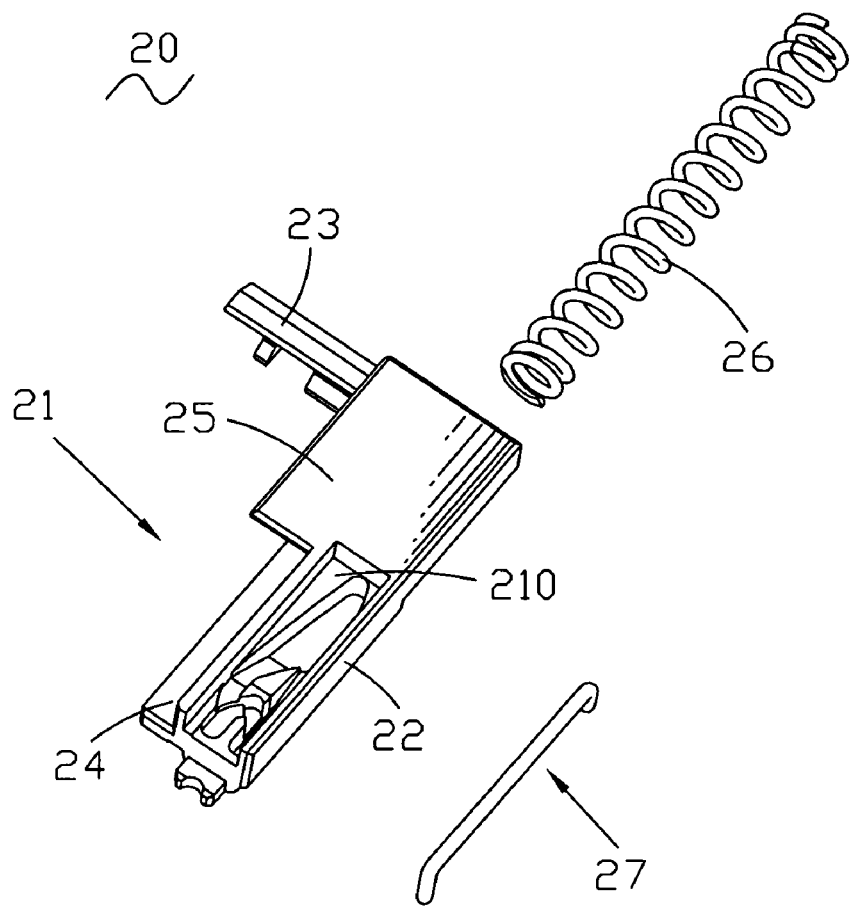
FIG. 5(A) is a perspective view of an ejector of the memory card connector.
Figure 5B:
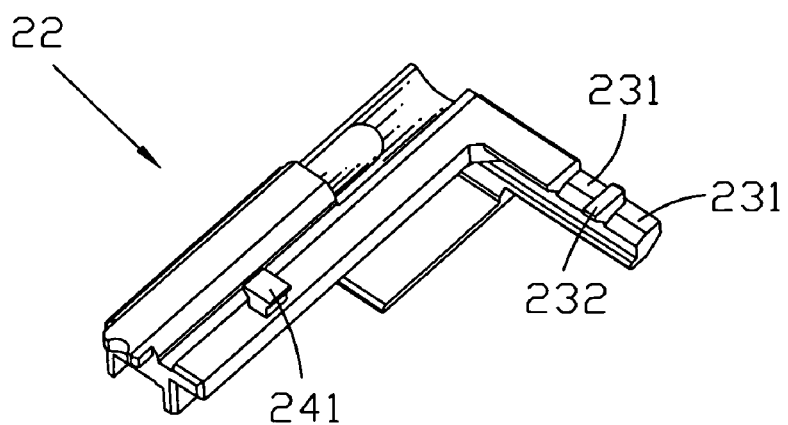
FIG. 5(B) is a perspective view of the ejector of the memory card connector viewed from another viewpoint.

Referring to FIGS. 5(A) and 5(B), the sliding portion 21 includes a body 22, the front of the body 22 extending inward to form a pushing potion 23. The bottom of the body 22 projectes to form a sliding beam 24. A pressing board 25 is engendered on the top of the body 22. A plurality of gaps 231 are formed on the back of the pushing portion 23. A resisting portion 232 is formed between the gaps 231. A sliding block 241 is engendered on the back of sliding beam 24.

Referring to FIG. 1 to FIG. 5(B), in assemblage, the plurality of first and second electric terminals 30, 40 are located on the first and second terminal troughs 111, 141 respectively. First touching portions 31 of the first electric terminals 30 extend upward in the holding space, and second touching portions 41 of the second electric terminals 40 extend backward in the holding space. The detected apparatus 50 includes a fixed terminal 51 and an activating terminal 52. The fixed terminal 51 is located in the first contain trough 117, and the activating terminal 52 is located on the second contain trough 118. The touching portion 521 of the activating terminal 52 extends upward in the holding space. The pressing portion 522 extends outward from the touching portion 521, and the pressing portion 522 elastic connects with the fixed terminal 51. The ejector 20 is placed in the glide notch 131. The pushing portion 23 is located at the inner of the holding space, and the ejector 20 is supported on the base 11 by the resisting portion 232. The ejector 20 connects with the support block 113 to form a second support beam 119. The sliding block 241 is placed in the sliding trough 115, and the pressing board 25 extends inward in the holding space. The cover 60 covers on the insulating housing 10.

Figure 6:
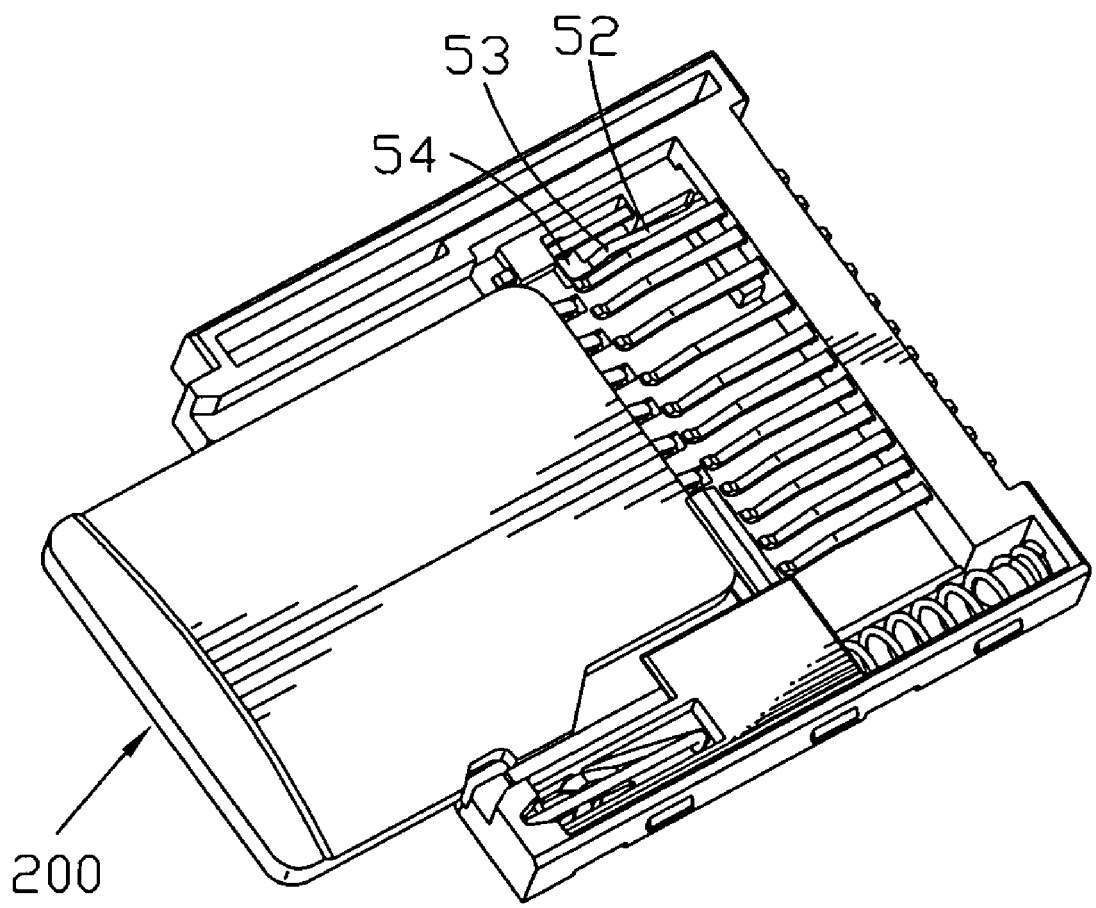
FIG. 6 is a perspective view of a first memory card inserted into the memory card connector without the cover.

Referring to FIG. 6 and FIG. 5(A), when the Micro SD card as a first memory card 200 is inserted into the under space 90, the front of the first memory card 200 pushes the pushing portion 23 to promote the sliding portion 21 moving forward and expressing the spring 26. The sliding beam 24 slides forward on the base 11. The pushing portion 23 and the first memory card 200 move forward under the second electric terminals 40. The first touching portion 31 of the first electric terminals 30 can be connected with the first memory card 200 when the first memory card 200 moves to the stopping block 114. The ejector 20 is in station at the same time. Meanwhile, the first memory card 200 expresses the touching portion 521 of the activating terminal 52 downward, so the pressing portion 522 of the activating terminal 52 is separated from the fixed terminal 51 and then produces electronic single to demonstrate the insertion is right. If the electronic single is not produced, so we can ensure that the way of insertion is a mistake.

Figure 7:
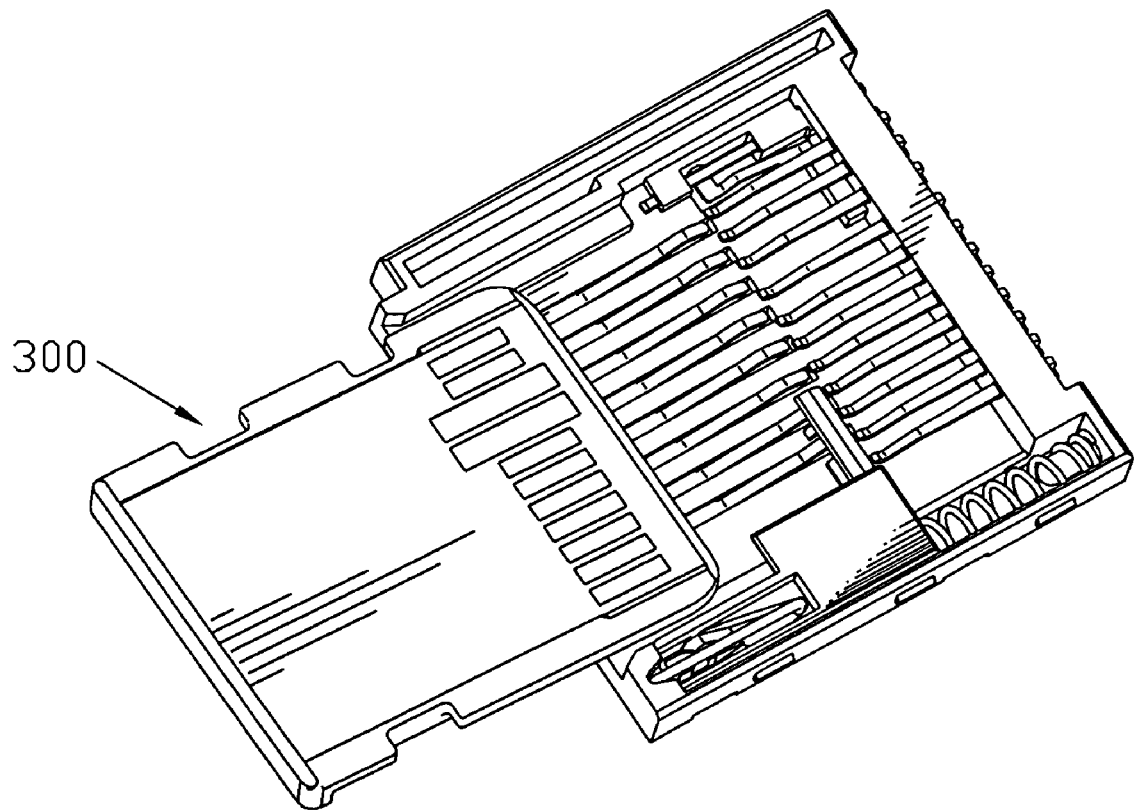
FIG. 7 is a perspective view of a second memory card inserted into the memory card connector without the cover.

Referring to FIG. 7 and FIG. 5(A), when the MSII card as a second memory card 300 is inserted into the memory card connector 100, both sides of the second memory card 300 slide on the first support beam 112 and the second support beam 119. The upper of the second memory card 300 is mounted in the under space 80, and the lower of the second memory card 300 is mounted in the upper space 90. The front of the second memory card 300 pushes the pushing portion 23 to promote the sliding portion 21 moving forward and expressing the spring 26. The sliding beam 24 slides forward on the base 11. The pushing portion 23 and the second memory card 300 move forward over the first electric terminals 30. The second touching portion 41 of the second electric terminals 40 can be connected with the second memory card 300 when the second memory card 300 moves to the stopping block 114. The ejector 20 is in station at the same time. Meanwhile, the second memory card 300 expresses the touching portion 521 of the activating terminal 52 downward, so the pressing portion 522 of the activating terminal 52 is separated from the fixed terminal 51 and then produces electronic single to demonstrate the insertion is right. If the electronic single is not existing between the activating terminal 52 and the fixed terminal 51 while the second memory card 300 is inserted into the memory card connector 100, so we can ensure that the way of insertion into the memory card connector 100 is a mistake.

What is claimed is:

1. A memory card connector, comprising:
   an insulating housing, having a base, a left wall arranged on the left side of the base, a right wall located on the right side of the base, and a front wall located on front of the base, a holding space defined by the walls, a plurality of first terminal troughs formed in the base, a first support beam rising from the base and being adjacent to the left wall, a support block rising from the base and being adjacent to the rear end of the right wall, a sliding trough arranged in the front of the support block on the base, a glide notch formed on the right wall, the left side of the glide notch connecting with the holding space, the first support beam and the support block dividing the holding space into an upper space and an under space, a plurality of second terminal troughs formed on the front wall and located above a stopping block;
   a plurality of first electric terminals located in the first terminal troughs;
   a plurality of second electric terminals located in the second terminal troughs, and a second touching portions of the second electric terminals extending backward in the holding space;
   an ejector placed on the glide notch, having a sliding portion, a spring and a connecting portion, the sliding portion including a body, the front of the body extending inward to form a pushing potion, and the pushing portion located at the inner of the holding space, the ejector connecting with the support block to form a second support beam, the upper space formed above the both support beams, the under space formed between the both support beams; and
   a cover, coving on the SIM card connector;
   wherein when a first memory card inserted into the under space, the front of the first memory card pushing the pushing portion to promote the sliding portion moving forward until the first electric terminals connecting with the first memory card, and
   when a second memory card inserted into the under space and the upper space, the front of the second memory card pushing the pushing portion to promote the sliding portion moving forward until the second electric terminal connecting with the second memory card.

2. The memory card connector as claimed in claim 1, further comprising a pressing board engendered on the top of the body.

3. The memory card connector as claimed in claim 1, further comprising a plurality of gaps formed on the back of the pushing portion.

4. The memory card connector as claimed in claim 1, further comprising a plurality of resisting portions formed between the gaps.

* * * * *